US008374921B2

(12) United States Patent
Diaz Perez

(10) Patent No.: US 8,374,921 B2
(45) Date of Patent: Feb. 12, 2013

(54) INTERACTIVE TV SYSTEM AND CO-LOCATED TRANSACTION-ORDERING WEB SERVER FOR ONLINE ORDERING OF ITEMS OF REAL-TIME AVAILABILITY FROM A SET-TOP-BOX CONNECTED TV

(75) Inventor: Milton Diaz Perez, Tiburon, CA (US)

(73) Assignee: Karl Schweitzer, Honolulu, HI (US)

( * ) Notice: Subject to any disclaimer, the term of this patent is extended or adjusted under 35 U.S.C. 154(b) by 275 days.

(21) Appl. No.: 12/872,101

(22) Filed: Aug. 31, 2010

(65) Prior Publication Data

US 2011/0093901 A1    Apr. 21, 2011

Related U.S. Application Data

(62) Division of application No. 11/530,379, filed on Sep. 8, 2006, now Pat. No. 7,788,136.

(51) Int. Cl.
*G06Q 30/00* (2012.01)
(52) U.S. Cl. ............... 705/26.61; 705/26.41; 705/26.7; 705/5; 725/60; 725/61
(58) Field of Classification Search .................. 705/1.1, 705/5–6, 26.1–27.2; 725/37, 52–53, 60–61
See application file for complete search history.

(56) References Cited

U.S. PATENT DOCUMENTS

| 6,014,636 | A  | * | 1/2000 | Reeder ........................ 705/17 |
| 7,590,997 | B2 | * | 9/2009 | Diaz Perez .................. 725/109 |
| 7,788,136 | B2 | * | 8/2010 | Diaz Perez .................. 705/27.1 |
| 2002/0123940 | A1 | * | 9/2002 | Spets ............................ 705/26 |
| 2002/0170061 | A1 | * | 11/2002 | DiLorenzo ..................... 725/78 |
| 2004/0107147 | A1 | * | 6/2004 | Uemura et al. ................ 705/26 |
| 2004/0249726 | A1 | * | 12/2004 | Linehan ........................ 705/26 |
| 2008/0017706 | A1 | * | 1/2008 | Malik ........................... 235/383 |

OTHER PUBLICATIONS

Park Hyatt carves new niche: Art ; Hotel chain will sell prints, sculptures; [Final Edition] Kitty Bean Yancey. USA Today. McLean, Va.: May 6, 2005. p. D.4.*
Hyatt offers a state of the art program; [ONT Edition] Toronto Star. Toronto, Ont.: Jun. 9, 2005. p. H.06.*

* cited by examiner

*Primary Examiner* — William Allen
(74) *Attorney, Agent, or Firm* — Leighton K. Chong

(57) ABSTRACT

An online ordering system for ordering of items of real time availability in inventory online employs An interactive TV system connected to a plurality of TV equipment units via a TV services platform, whereby a TV viewer can view an advertisement for a transactable item on the TV display and send a request for ordering the item by signals sent by the TV remote control unit to the TV services platform. A transaction-ordering web server is co-located with and operatively connected to the TV services platform for processing requests from TV viewers into web orders sent online via Internet connection to online ordering websites for processing against real time vendor inventories and confirming transactions of ordered items. The TV system may be a hotel in-room TV system coupled to a hotel purchase management system to manage guest billings for purchases. The hotel in-room TV system can provide guests with updates of activities and advertisements for guest activities on the in-room TV. It can also send messages to guest cellphones or mobile devices and process billings for guest requests.

7 Claims, 11 Drawing Sheets

INTERACTIVE TV SYSTEM AND CO-LOCATED TRANSACTION-ORDERING WEB SERVER FOR ONLINE ORDERING OF ITEMS OF REAL-TIME AVAILABILITY FROM A SET-TOP-BOX CONNECTED TV

This U.S. Patent Application is a divisional application claiming the priority benefit of copending U.S. patent application Ser. No. 11/530,379, filed on Sep. 8, 2006, by the same inventor, issued as U.S. Pat. No. 7,788,136 on Aug. 31, 2010.

TECHNICAL FIELD

This invention generally relates to an online ordering system and, more particularly, to a system which enables a TV viewer to order items of real-time availability online by sending an order request from a TV system.

BACKGROUND OF INVENTION

For many years, it has been desired to produce a convergence of the TV with online commerce so that TV viewers at home or at other viewing locations can order goods or services or make reservations or bookings online while watching TV. The capability to order online while watching TV has the advantage that items seen on TV but subject to real-time availability can be requested and ordered from current inventory and confirmed on the TV. Furthermore, it has been desired to carry out such "t-commerce" using a standard TV remote control unit, without having to work at a keyboard of a PC or other computer device. Such a t-commerce convergence system would have the potential to greatly increase the value of TV advertising and the volume of sales or bookings made while watching TV ads.

Telephone ordering by calling vendors on their "800" numbers has long been used in conjunction with TV promotions and product advertising. However, the TV promotions and advertising must be pre-recorded and scheduled in the TV programming far in advance, and therefore the system does not have the flexibility to provide TV viewers with up-to-the-moment information on availability of products or currently offered discounts. Also, in order to avoid long waiting times for callers on the telephone, the vendors must operate multi-line phone banks to handle the surges of customer call-ins during ad runtimes, thus making this type of system uneconomic for smaller vendors.

In other attempts at TV/online commerce convergence, cable TV systems have offered "TV shopping malls" on a special channel where viewers can order simple items such as pizza for delivery. Viewers can enter their selection using the standard TV remote control to send signals to the set-top box unit which are transmitted to the cable TV server headend and then forwarded from the cable headend to the vendor along with the TV viewer's name/address or phone number (a vendor callback is required) for delivery. However, this type of cable TV order-forwarding system is slow, cumbersome, and can handle only limited types of items that cannot readily be changed or updated unless the shopping mall channel is frequently reprogrammed. Moreover, for offering items from a plurality of vendors, the cable TV system must first establish each vendor's ordering system on its headend platform, which makes the system inconvenient or uneconomical for smaller vendors or vendors with items of constantly changing types or availability.

A similar type of cable TV order-forwarding system uses video-on-demand (VOD) channels in the cable TV lineup to allow a viewer to navigate to an advertisement or infomercial of interest then press a button on the remote control unit to send a request for more product information to be sent to the cable subscriber's address or a callback to the subscriber's phone number. This type of system might also be used to enable the TV viewer to make purchases and have them charged to the their cable TV subscriber billing account. However, this type of VOD order-forwarding system only allows ordering of items pre-programmed and scheduled in advance as VOD advertising or infomercials and cannot readily be changed or updated unless the video-on-demand channels are frequently reprogrammed.

Another previous attempt was the so-called "two-screen TV" system in which viewers watched TV for advertising of product promotions or discounts and then used their computers with online connectivity to visit the vendors websites to complete their orders or entries. This type of system required both the TV and computer to be located in the same room and was very cumbersome to use and of limited interest to TV viewers.

Another type of so-called "Internet TV" system employs a co-located Internet server with online connectivity at the cable TV headend so that interactive webpages can be displayed in a browser channel on the TV, and viewers can navigate and enter input in response to the webpages using their TV remote control unit or a provided keyboard for ordering items online. However, the cable TV operators have resisted subsidizing the co-location of third-party equipment on their facilities to enable external purchases through their system, and therefore the providers of such "Internet TV" services have found it difficult to recover their costs of providing browser-enabled set-top boxes and keyboards for TV customers and co-located headend equipment.

It has also been desired to enable guests staying at hotels to reserve or book activities for sightseeing or entertainment at the travel destination. When not on business travel, hotel guests most often do not bring along laptop computers for Internet access. Many hotels do not offer in-room Internet-access equipment and/or charge high fees for Internet connectivity. Vendors of local activities are typically many smaller companies that cannot pay for the costs of online ordering systems in hotel rooms, and their activities are subject to constantly changing inventory (ticket or seat) availability as well as date or time-sensitive pricing or discounting. As a result, vendors typically are compelled to distribute their inventories of activities through telephone-order processing wholesalers at heavily discounted block pricing. Enabling hotel guests to order or book activities through direct online access to vendors' inventories from the in-room hotel TV would not only raise vendor profitability, but would also have the advantage for guests of being able to access up-to-date information on availability and current pricing and to automatically receive a TV display confirmation without having to call an 800 number and waiting to speak to an agent.

SUMMARY OF THE INVENTION

In accordance with the present invention, a system for online ordering of items of real-time availability from a TV system comprises:

(a) an online ordering website for processing online orders for transactable items from vendor inventories, said online ordering website being operable with an associated database maintaining real-time vendor inventories of transactable items in order to confirm acceptance of an order for a selected item by checking the respective inventory for the selected item and confirming acceptance of the order;

(b) a TV system having a TV display operable with a TV control unit wherein a viewer can view advertisements of transactable items on the TV display and send a request for ordering a selected item using the TV control unit;

(c) an online agent ordering server operatively connected to the TV system and to at least one online ordering website and associated vendor inventories of transactable items, wherein said online agent ordering server stores a plurality of TV ordering display templates for presenting displays on the TV system of TV ordering forms for respective transactable items, and a corresponding plurality of online ordering templates for online ordering of respective items in formats recognized by the online ordering website for ordering transactable items from the vendor inventories, wherein, upon a viewer inputting a request for a selected item via the TV control unit to the TV system, said online agent ordering server receives the request and provides a TV ordering display template corresponding to the requested item for displaying the corresponding TV ordering form on the TV display, and upon the viewer inputting order selection data for ordering the item in response to the displayed TV ordering form, said online agent ordering server receives the order selection data input by the viewer and automatically converts the data into an online order for the selected item formatted in the corresponding online ordering form to the online ordering website for ordering the item from the corresponding vendor inventory.

In the present invention, the online agent ordering server acts as an intermediary, converting a viewer request for an item on the TV system into an online order in an ordering format that would be recognized by the online ordering website. The online agent ordering server automatically converts an online confirmation message sent by the online ordering website to a TV display confirmation message sent to the TV system for display to the viewer. By acting as an intermediary between the TV system and the online ordering website, the online agent ordering server provides the link that enables TV orders to be automatically processed into online orders, and online order confirmation messages into TV confirmation displays. Once an order has been confirmed, the viewer can review, modify or cancel the order by accessing the order information through the TV system. The online agent ordering server may be co-located or incorporated with the TV system, or it may be addressable on the Internet at a separate Internet website address so that it can be accessed by other TV systems as well.

In one preferred embodiment, the online ordering website is an online activities booking website for consolidating bookings of transactable activities (tickets, seats, or reservations for recreational activities), the TV system is a hotel TV system for guest in-room TVs (operable with a standard TV remote control through a set-top box), and the online agent ordering server is an online hotel ordering server that processes activities booking orders for recreational activities for one or more hotel properties. Through the intermediary of the online hotel ordering server, the hotel TV system enables hotel guests to order recreational activities from online websites using the TVs in their hotel rooms.

The hotel TV system can combine the activities ordering functions on its TV platform handling programmed TV channels, movie-on-demand channels and other hotel-specific channels for hotel guest viewing. The hotel property management system (HPMS), which is used by the hotel to manage guest billings, can be linked to the activities ordering functions operable with the hotel TV system to put activity orders on guest billings and to provide guest billing information to the in-room TVs. The online hotel ordering server may process elements of the guest-specific HPMS data, such as verifying if the guest is restricted from making purchases on the hotel TV system or has insufficient credit to order activities. A guest advertising channel on the hotel TV system can be a programmed with attractive advertising for activities of interest and enable a guest to order an activity while viewing the ad on the guest advertising channel. Using the hotel TV system, the hotel guest can press designated keys on the TV remote control unit to select the activity, input a requested number of tickets or seats and a time/date for the activity, and send the request to the online activities booking website. Once the order has been confirmed, the hotel guest is able to review, modify or cancel the order by accessing the order information through the hotel TV system.

In a preferred implementation of the hotel activities ordering system, the online hotel ordering server is addressable on the Internet at a separate Internet address for access by a plurality of hotel TV systems serving different hotel properties. The hotel ordering server can be scaled to act as the intermediary for a plurality of hotels and/or to a plurality of online activity booking websites. The online hotel ordering server can also receive updated (seasonal, discounted, or urgent offering) activity information from the activity vendors for display of updated ads on the guest advertising channel and for ordering from the TV display using the updated information. For example, if a vendor has a number of unbooked seats for an activity that will soon start, such as 50 seats on a cruise that departs in 2 hours, the vendor can immediately offer those seats at a steep discount to the guests of a hotel by updating the appropriate activities information to the online activity booking website, which in turn updates the online hotel ordering server for immediate upload and display of the discount offer on the guest advertising channel of the hotel TV system.

Other objects, features, and advantages of the present invention will be explained in the following detailed description of the invention having reference to the appended drawings.

DETAILED DESCRIPTION OF INVENTION

Figure 1:
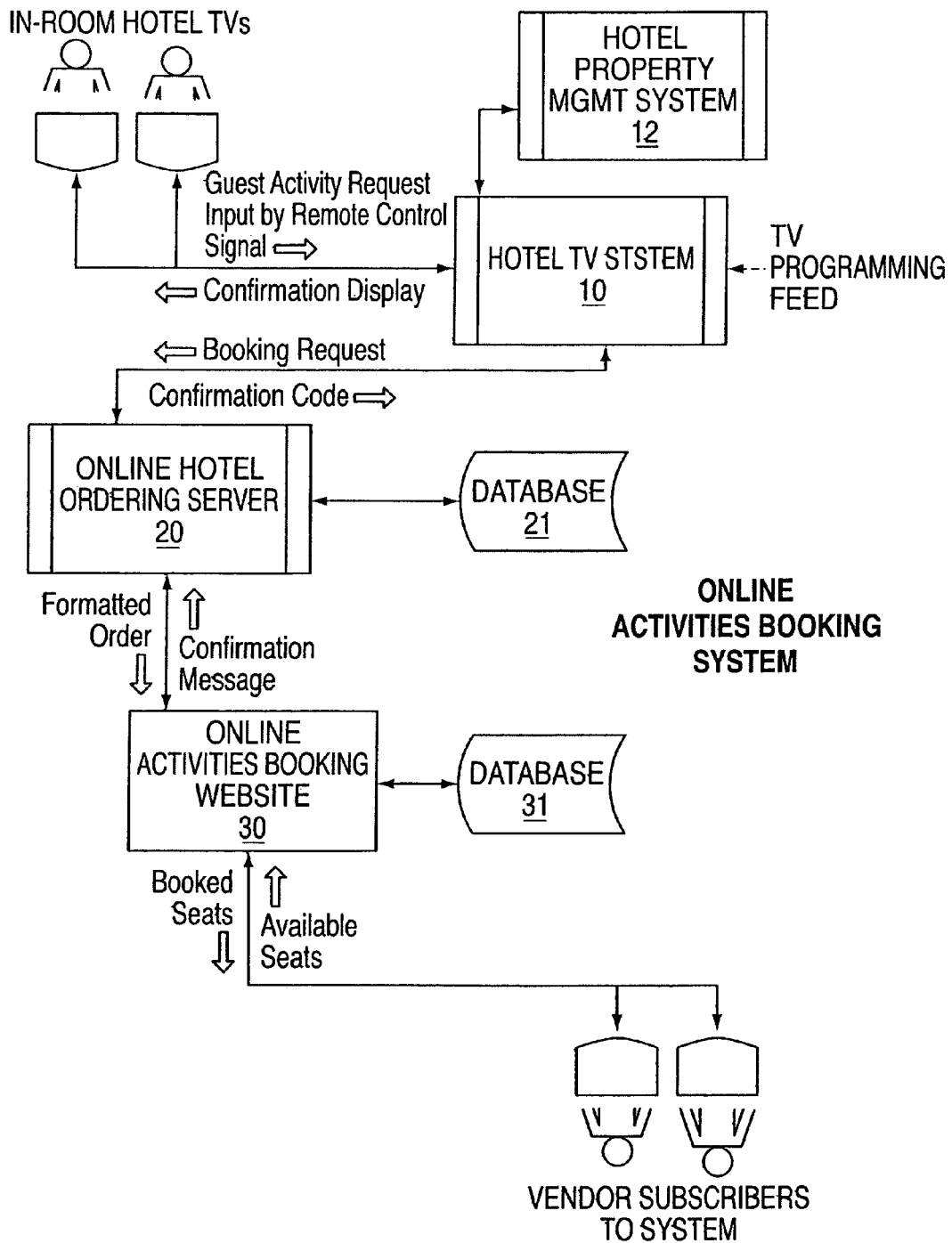
FIG. 1 is a schematic diagram of the system architecture for a preferred hotel activities ordering system in accordance with the present invention.

In the following detailed description, certain preferred embodiments are described as illustrations of the invention in a specific application, network, or computer environment in order to provide a thorough understanding of the present invention. However, it will be recognized by one skilled in the art that the present invention may be practiced in other analogous applications or environments and with other analogous or equivalent details. Those methods, procedures, components, or functions which are commonly known to persons in the field of the invention are not described in detail as not to unnecessarily obscure a concise description of the present invention.

Some portions of the detailed description which follows are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Aspects of the present invention, described below, are discussed in terms of steps executed on a computer system. Aspects of the present invention are also discussed with respect to an Internet system including electronic devices and servers coupled together on an Internet server platform. Any "server", "online website", "system", or "platform" can be implemented using a general purpose computer system programmed with suitable software. Although a variety of different computer systems can be used with the present invention, an exemplary computer system is shown and described in the preferred embodiment.

In general, computer systems that can be used by the present invention comprise an address/data bus for communicating information, a central processor coupled with the bus for processing information and instructions, a volatile memory (e.g., random access memory) coupled with the bus for storing information and instructions for the central processor and a non-volatile memory (e.g., read only memory) coupled with the bus for storing static information and instructions for the processor. Computer system may also includes a data storage device ("disk subsystem") such as a magnetic or optical disk and disk drive coupled with the bus for storing information and instructions and a display device coupled to the bus for displaying information to the computer user.

The invention is described as implementable in an extended network environment such as the current Internet. The Internet is made up of many smaller networks interconnected together and accessible from almost anywhere in the world. It has become commercialized into a worldwide information network, containing information on virtually every subject known to humankind. Due to the prevalence and popularity of the World Wide Web (also called the "Web") comprised of websites, webpages, and web resources maintained on web servers around the world, a great number of Internet users can receive and/or access up-to-date information of interest to them from anywhere on the Internet. As is well-known in the industry, the World Wide Web uses the industry-standard TCP/IP protocol for linking websites, webpages, and web resources through standard addressing and linking methods employed via a web browser.

In accordance with the present invention, a system for ordering items of real-time availability online receives an order request from a TV system through an online agent ordering server and processes the request for ordering a selected item into an online order in a web-based format that can be recognized by an online ordering website that manages the inventory of the vendor for that item. In a typical TV network connected to TV units operable through a set-top box and standard TV remote control unit, the viewer inputs order selection data using the remote control unit to the set-top box which is then transmitted by the TV system to the online agent ordering server. The TV system may have functions to combine the viewer's order request input with metadata and item-specific data from the online agent ordering server database and with any relevant viewer data made available by the interactive TV system regarding the viewer. The online agent ordering server automatically converts the TV order request into an online order in a standard web-based ordering format for automatic processing by the online ordering website. Conversely, the server receives a web-based formatted confirmation message back from the online ordering website and automatically converts it into a TV confirmation message displayed on the viewer's TV. Once an order has been confirmed, the viewer is able to review, modify or cancel the order by accessing the order information through the TV system.

The intermediary of the online agent ordering server provides the link that enables the TV viewer to send TV order requests to online ordering websites using only the standard TV remote control unit, and conversely to receive TV confirmation messages based on the response from the online ordering website. The online agent ordering server may be co-located or incorporated with the TV system headend, or it may be addressable on the Internet at a separate Internet address for accessing by other TV systems serving different TV service groups or areas.

In a preferred application of the invention ordering system described in greater detail below, the TV system is a hotel TV system, the online ordering website is an online activities booking website, and the online agent ordering server is an online hotel ordering server which processes in-room TV orders from hotel guests into bookings for various activities offered by local vendors. This preferred application is described as an illustrative example of the utility of the invention ordering system. However it is to be understood that the invention is not limited to hotel ordering systems, but extends to other fields of application within the general principles of the invention disclosed herein as well as to any equivalent systems or components thereof.

Referring to FIG. 1, a preferred application of the invention ordering system is illustrated in which a plurality of in-room TVs maintained by a hotel TV system 10 are connected through an online hotel ordering server 20 to an online activities booking website 30. The online hotel ordering server 20 maintains a database 21 containing metadata, activity-specific data, videos and graphic images received from the online activity booking website database 31 for display by the hotel TV system when requested from the online hotel ordering server by the viewer. The online activities booking website 30 maintains a database 31 for tracking the inventories of available tickets or seats for various activities offered by a plurality of vendors subscribers to the online activities booking system. The online activities booking website 30 can allow vendor subscribers to have access to their accounts for review, correction, and updating of the system information on activities, packages, rates, and discounts as well as descriptive information, graphic images and videos regarding the activities. It automatically processes orders received in a standard web-based format online from the hotel ordering server 20 by checking its database 31 for the number of tickets or seats requested, booking the orders if the requested tickets or seats are available, and issuing confirmation messages confirming the booked orders which will result in TV display confirmations on the in-room hotel TVs of the guests who requested the orders.

The in-room hotel TVs are installed in the rooms of the hotel guests and are connected to a TV system headend controlled by the hotel TV system 10. Each in-room hotel TV has a TV display, a set-top box connected to the TV display for selecting TV channels and other TV-related service options, and a TV remote control unit with a keypad for allowing a guest to input keypresses to select desired TV channels and service options. The hotel TV system typically receives an input feed of bundled TV programming from a cable TV, satellite TV, or broadband TV services operator for that service area. It can provide the bundled TV programming to the in-room hotel TVs, or it can filter from the input feed a more limited set of TV channels to be offered to guests, as well as combine with the feed any movie-on-demand channels and other hotel-specific channels as determined for that hotel. For example, the hotel TV system can add in a Hotel Welcome channel, a Hotel Events channel, an Activities Advertising channel, Movie-on-Demand channels, Pay-Per-View channels, etc. An example of a widely deployed type of hotel TV system is the SigNETureTV System offered by LodgeNet Entertainment, of Sioux Falls, S. Dak. As such hotel TV systems are well known in the industry, they are not described in further detail herein.

The hotel TV system 10 may be coupled to a hotel property management system (HPMS) 12 which tracks and manages the hotel billing for guests. The HPMS system 12 stores data on the registered guests in rooms at the hotel, including names, addresses, number in party, credit card information, and any special requirements or personal preferences. In typical hotel TV systems, the hotel TV system 10 can receive data regarding the registered guests from the HPMS system 12 for use by the hotel TV system 10 and by applications and servers connected to the hotel TV system 10. The hotel TV system 10 can send data on pay-per-view movies ordered by hotel guests to the HPMS system 12, which records charges for the requested movies to the billing accounts for those guests. Thus, when the guests are ready to check out, the movie charges are included with other hotel charges on the guests' billing statements.

The hotel TV system commonly includes a Guest Advertising Channel programmed with attractive advertising for local activities of interest and enabling a guest to order an activity while viewing its ad. A Guest Advertising Channel may be presented on the hotel TV system as a time-linear television channel displaying promotional videos regarding the activities an alternative implementation of a Guest Advertising Channel is an interactive TV presentation of menus and templates, providing the viewer with the ability to select and display graphics, descriptive information and videos regarding the activities on an interactive, on-demand basis. Using the hotel TV system, the hotel guest can press designated keys on the TV remote control unit to select the activity, input the requested number of tickets or seats and time/date for the activity, and send the request to the online activities booking website to book and confirm the order. The HPMS system 12 can be made operable with the hotel TV system to put the guest activity orders on the guest's billing. Payments for the activity orders are then disbursed by the hotel to the online hotel ordering server firm for disbursement to the respective vendors.

A guest viewing an ad for an activity on the Guest Advertising Channel can press a designated button on the TV remote control unit to request an order for that activity. The request signal is sent to the hotel TV system 10 which then connects to the online hotel ordering server 20 to generate and display additional information regarding the activity and present one or more ordering prompts on the guest's TV to input, for example, the number of guests in the order and the date and/or time of the activity. The guest's request with item selection signals are then combined by the online hotel ordering server with metadata and activity-specific data from the online hotel ordering server database 21 and with guest-specific data from the HPMS 12 that is retrieved by the hotel TV system 10 to form a complete guest activity order. The online hotel ordering server may process elements of the guest-specific HPMS data, such as verifying if the guest is restricted from making purchases on the hotel TV system or has insufficient credit to order activities. The online hotel ordering server 20 automatically converts the guest order into an online order in a standard web-based ordering format for automatic processing by the online activities booking website 30. The online hotel ordering server 20 receives a web-based formatted confirmation message back from the online activities booking website 30 and automatically converts it into a TV system order confirmation code that is interpreted by the hotel TV system 10 to generate a TV display confirmation of the booking of the order on the guest's TV. Once an order has been confirmed, the guest is able to review, modify or cancel the order by accessing the order information through the hotel TV system.

Figure 2:
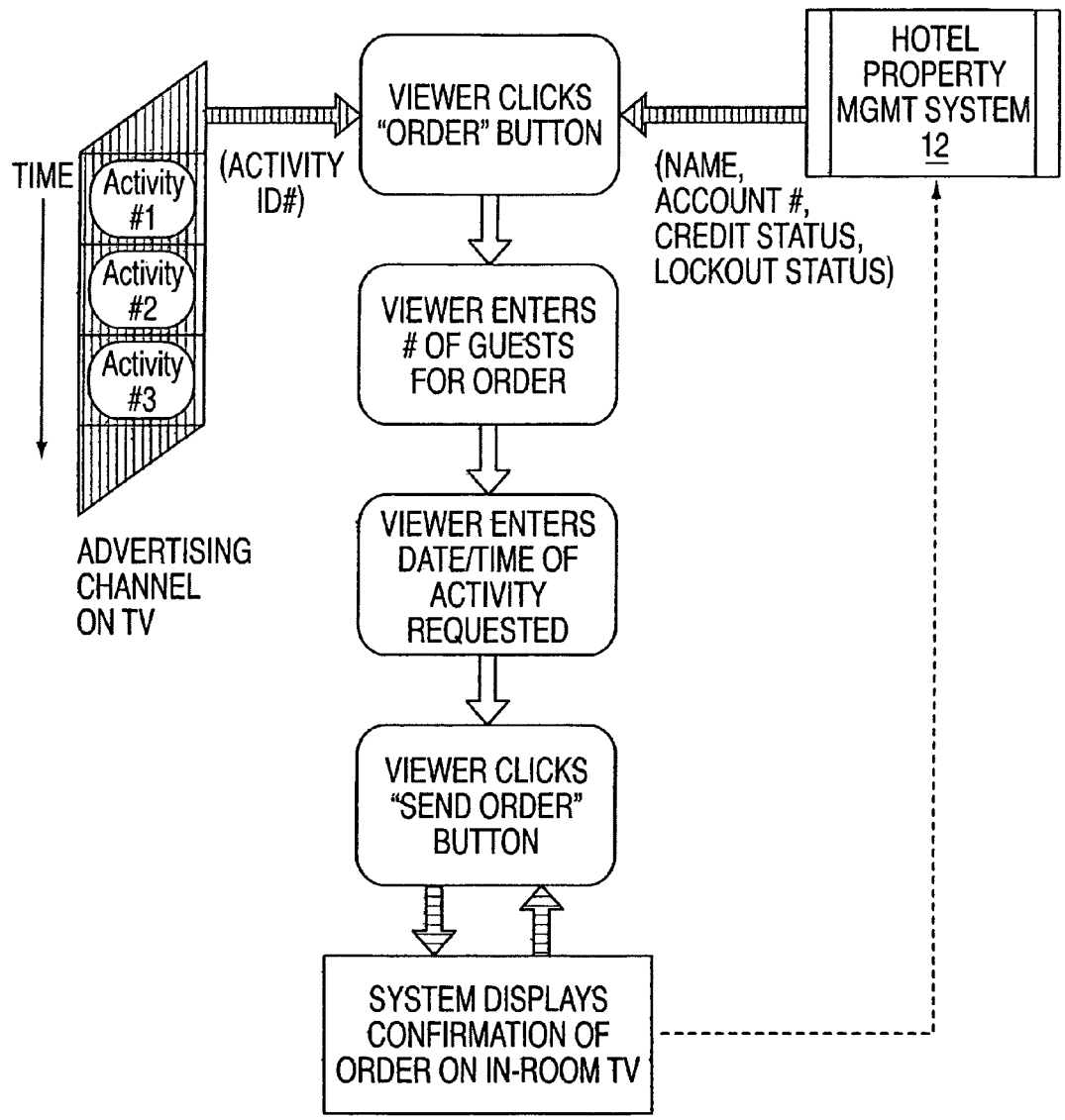
FIG. 2 illustrates the TV interface to the viewer for a time-linear guest advertising channel in the preferred hotel activities ordering system.

Referring to FIG. 2, an example of the TV viewer's interface for activities ordering from a time-linear Guest Advertising Channel is described in further detail. As many visitors to a travel destination commonly do, the hotel guest will surf through the TV channels offered on the in-room TV and may be attracted by the various activities advertised on the Guest Advertising Channel. If the guest wants to order Activity #1, for example, a click of the "Order" button (such as the "Select" button or one of the "A", "B", "C" function buttons) on the standard TV remote control unit will cause the hotel TV system platform to identify the Activity ID# from the current time position on the Guest Advertising Channel and the guest name, room and billing information from the HPMS system. The guest is then prompted to enter the number of guests for the order, and the date and/or time of the activity requested. When the order information is complete, the guest can then click the "Send Order" button (such as the "Exit" button or one of the "A", "B", "C" function buttons) on the TV remote control unit to send the order request to the online activities booking website. When the order is booked, a confirmation of the booking of the order is displayed to the guest on the in-room TV. A record of the confirmed activity order is also stored by the HPMS system. Once an order has been confirmed, the guest is able to review, modify or cancel the order by accessing the order information through the hotel TV system.

Figure 3:
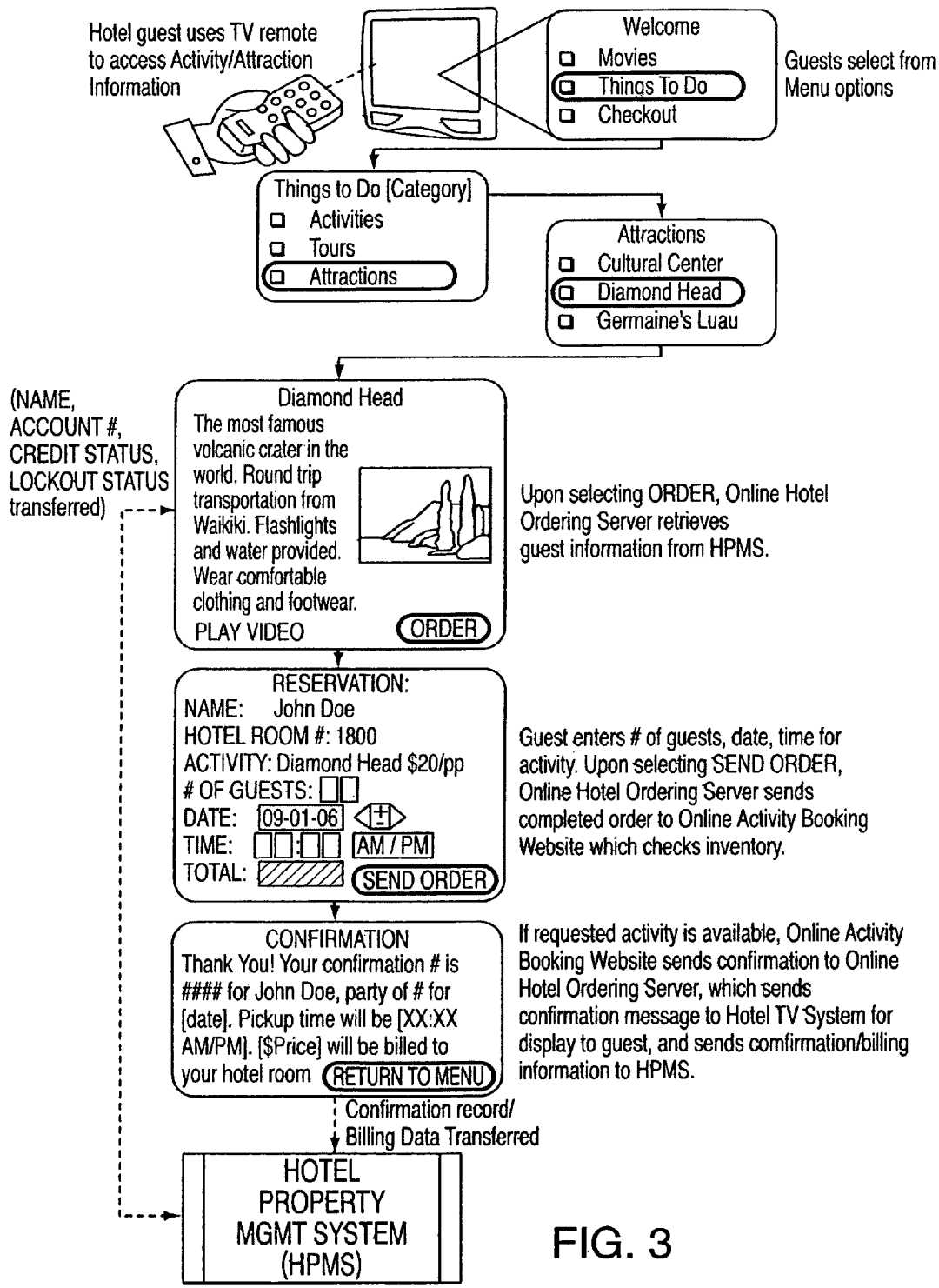
FIG. 3 illustrates the TV interface to the viewer and information flow for selecting, sending, booking, and confirming an order from an interactive guest advertising channel in the preferred hotel activities ordering system.

Referring to FIG. 3, an example of the TV viewer's interface for activities ordering and the corresponding information flow for a typical guest activity order on the interactive Guest Advertising Channel is illustrated in further detail. The guest accesses the interactive television system by pressing the appropriate button on the hotel TV system remote control. The hotel TV system displays a menu of advertising and services categories and the guest performs menu selections using the hotel TV system remote control. The hotel guest accesses the Guest Advertising Channel to view the various featured activities and attractions, which may be divided into different categories viewable on related channels, as well as into separate titles viewable as on-demand video segments. Using the hotel TV system remote, the guest is able to drill down to activity-specific images, videos and ordering capabilities. If the guest selects the "Diamond Head" activity for viewing, an introductory screen displays a photo and a brief description of the activity. A footnote on the display gives the viewer the option to click the "Order" button or the "Play Video" button. If the "Play Video" button is clicked, a 15 or 30-second advertisement or infomercial of the activity is displayed. Clicking on the "Order" button causes the guest information to be retrieved from the HPMS system to append to the order request. A "Reservation" form is then displayed reflecting the guest's name, hotel room, billing information, Activity ID and price. The display prompts the viewer to enter the number of guests, date and/or time by highlighting in sequence the blanks to be filled in. When the order information is complete, the guest clicks on the "Send Order" button to send the order information to the online activities booking website. When the order is booked, a confirmation is displayed on the TV with a standard message filled in with the assigned Confirmation #, Guest Name, # in Party, Date/Time of pickup, and total charge to be added to the hotel room bill. A record of the confirmed activity order is also stored by the HPMS system. The viewer can then click "Return to Menu" to view or order other activities.

Figure 4:
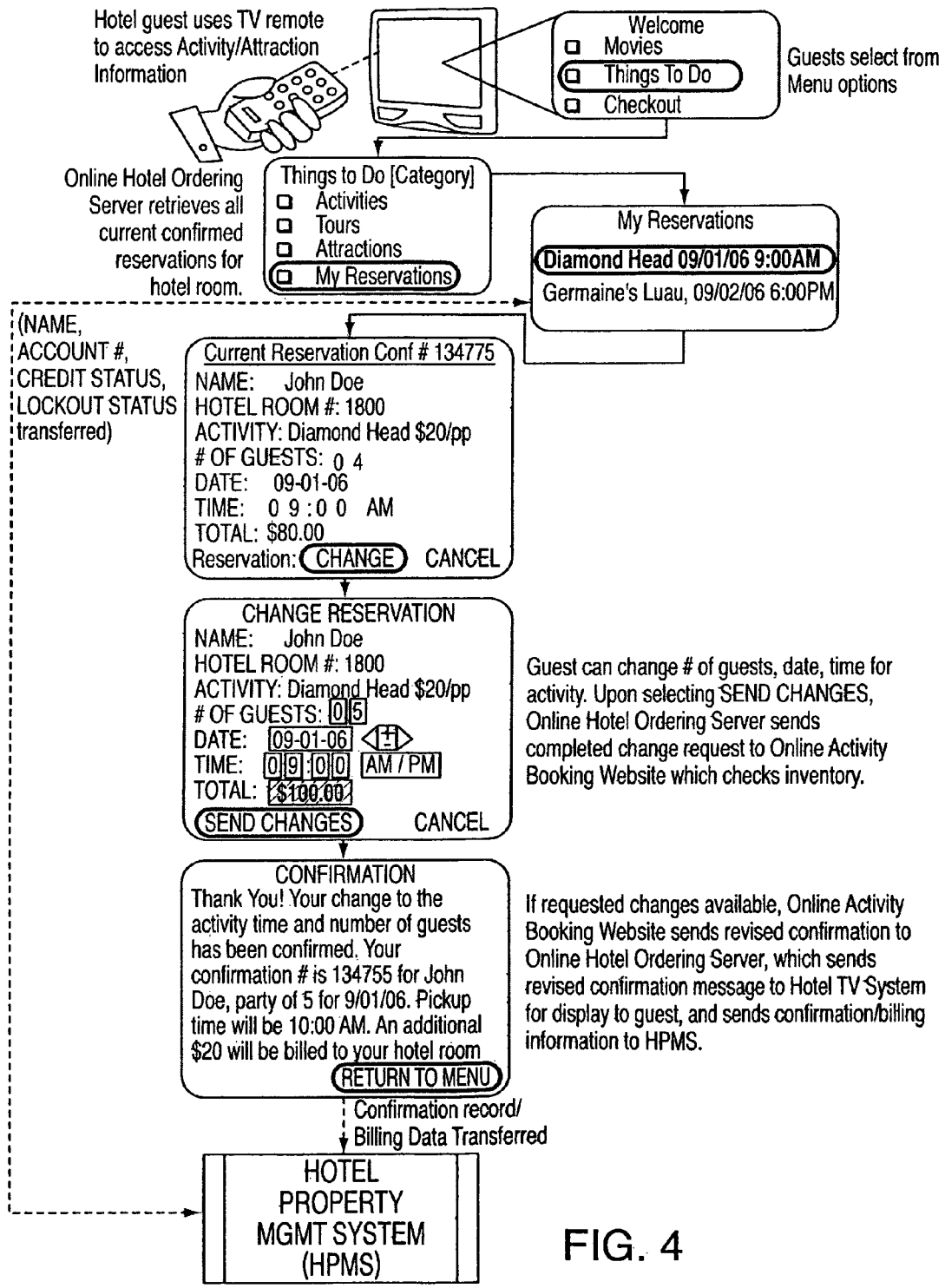
FIG. 4 illustrates the TV interface to the viewer and information flow for reviewing, modifying or canceling a previously confirmed order from an interactive guest advertising channel in the preferred hotel activities ordering system.

Referring to FIG. 4, an example of the TV viewer's interface for modifying activities orders previously purchased through the hotel TV system and the corresponding information flow for modifying existing activities orders on the interactive Guest Advertising Channel is illustrated in further detail. The guest accesses the interactive television system by pressing the appropriate button on the hotel TV system remote control. The hotel TV system displays a menu of advertising and services categories and the guest performs menu selections using the hotel TV system remote control. The hotel guest accesses the Guest Advertising Channel to view the various featured activities and attractions, and to display and manage activities reservations that have already been purchased on the hotel TV system. If the guest selects the "My Reservations" category for viewing, the Online Hotel Ordering Server retrieves from its database all currently booked activities for the hotel room. A footnote on the display gives the viewer the option to click the "Change" button or the "Cancel" button. If the "Cancel" button is clicked, the guest is taken through the steps necessary to cancel the reservation and receive the appropriate refund if applicable. Clicking on the "Change" button causes the "Current Reservation" form to be displayed reflecting the confirmation number, guest name, hotel room, activity description, date and time of booking, number of guests and the price previously charged to the guest HPMS account. The display prompts the viewer to modify the number of guests, date and/or time by highlighting in sequence the fields available to change. When the change request is complete, the guest clicks on the "Send Changes" button to send the change request to the online activities booking website. When the changes are booked, a revised confirmation is displayed on the TV with a standard message filled in with the Confirmation #, Guest Name, # in Party, Date/Time of pickup, and new charge to be added to the hotel room bill if applicable. A record of the revised confirmed activity order is also stored by the HPMS system. The viewer can then click "Return to Menu" to view or order other activities.

By using the Guest Advertising Channel to view activity ads and the HPMS system to retrieve guest information, the viewer can send an order request with a minimum of effort because the system automatically identifies the activity by the advertising being watched by the viewer and appends the guest information for the hotel room. Fraudulent or prank ordering can be prevented by allowing the guest to set an access passcode which must be input at the beginning of the session in order to create and send an order request. Billing and payment are also facilitated by having the ordered activities billed to the guest room billing using the HPMS system. The HPMS can provide a Credit Status for the guest that allows the online hotel ordering server to verify that the guest has credit and is able to accept charges to the guest room bill.

Distribution System for Activities Ordering

Figure 5:
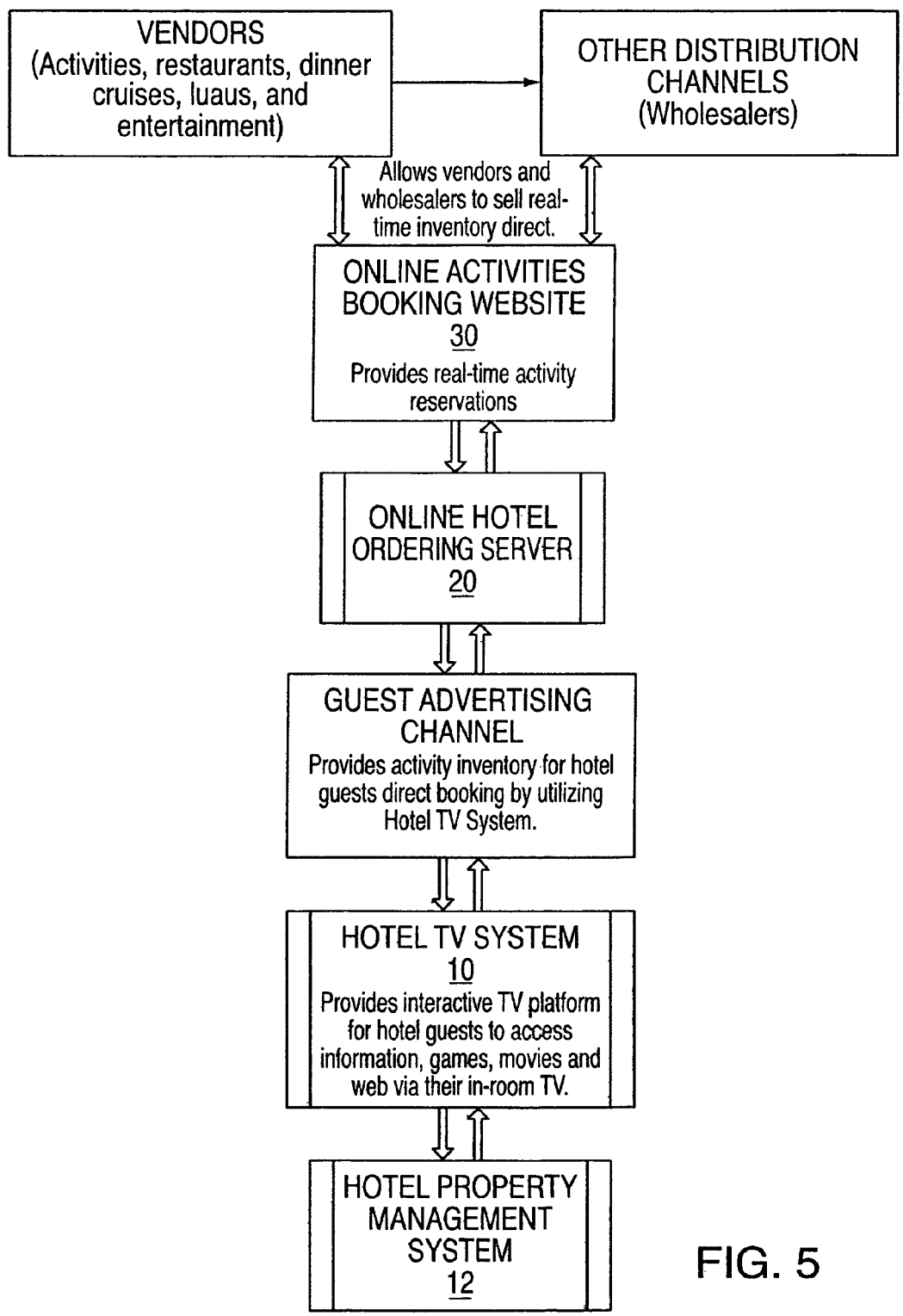
FIG. 5 is a schematic diagram of components of an overall distribution system for activities ordering.

FIG. 5 illustrates the components of an overall distribution system for the preferred method of activities ordering from the hotel TV. The Online Hotel Ordering Server links the booking of activities (upper part of figure) to the services provided by hotels to guests (lower part of figure). Using the Online Hotel Ordering Server, a subscribing Hotel can provide a distribution channel for activities booking to its guests via the in-room TV. The Hotel TV System provides the platform for hotel TV services to hotel guests, including broadcast and cable channels, movies, hotel information channels, and often video games and even Web access. The Guest Advertising Channel on the TV allows guests to see activities ads (either on a serial, time-linear "program wheel" or by selection from a menu) on the TV, and to send a request for a selected activity using the TV remote control unit to send selection signals for the order to the Hotel TV System providing hotel TV services. The Hotel provides access to its HPMS system to the Hotel TV System to facilitate guest ordering and handles payments for activities ordered by guests, and receives a commission on transactions booked through its system.

The Online Hotel Ordering Server acts as the intermediary to convert order requests from the Hotel TV System into online orders and, conversely, to convert online confirmations into confirmation displays on the Hotel TV System. The online activities ordering industry aggregates a plurality of vendors for activities, restaurants, cruises, entertainments, etc., as subscribers to the Online Activities Booking Website for online booking of orders. While the orders may simply be reservations for various activities, its best use is for booking orders for tickets or seats to activities and managing payments for the booked orders. When orders are submitted online to the Online Activities Booking Website, the Website can check the activity inventories for availability in real-time, and can then confirm these bookings. The activity inventories are maintained via the Website's database, which can be updated online from time-to-time by the vendor subscribers. Orders are confirmed by sending the hotel guests a confirmation message with a unique confirmation code. In effect, the confirmation code acts as a paperless voucher in the online system. Records of the confirmed orders are maintained by the HPMS system as well as the Online Activities Booking Website. Guests are billed by the Hotel for the confirmed orders, and the Hotel makes payment to the operator of the Online Hotel Ordering Server which distributes payments for activities booked to the vendors.

Figure 6A:
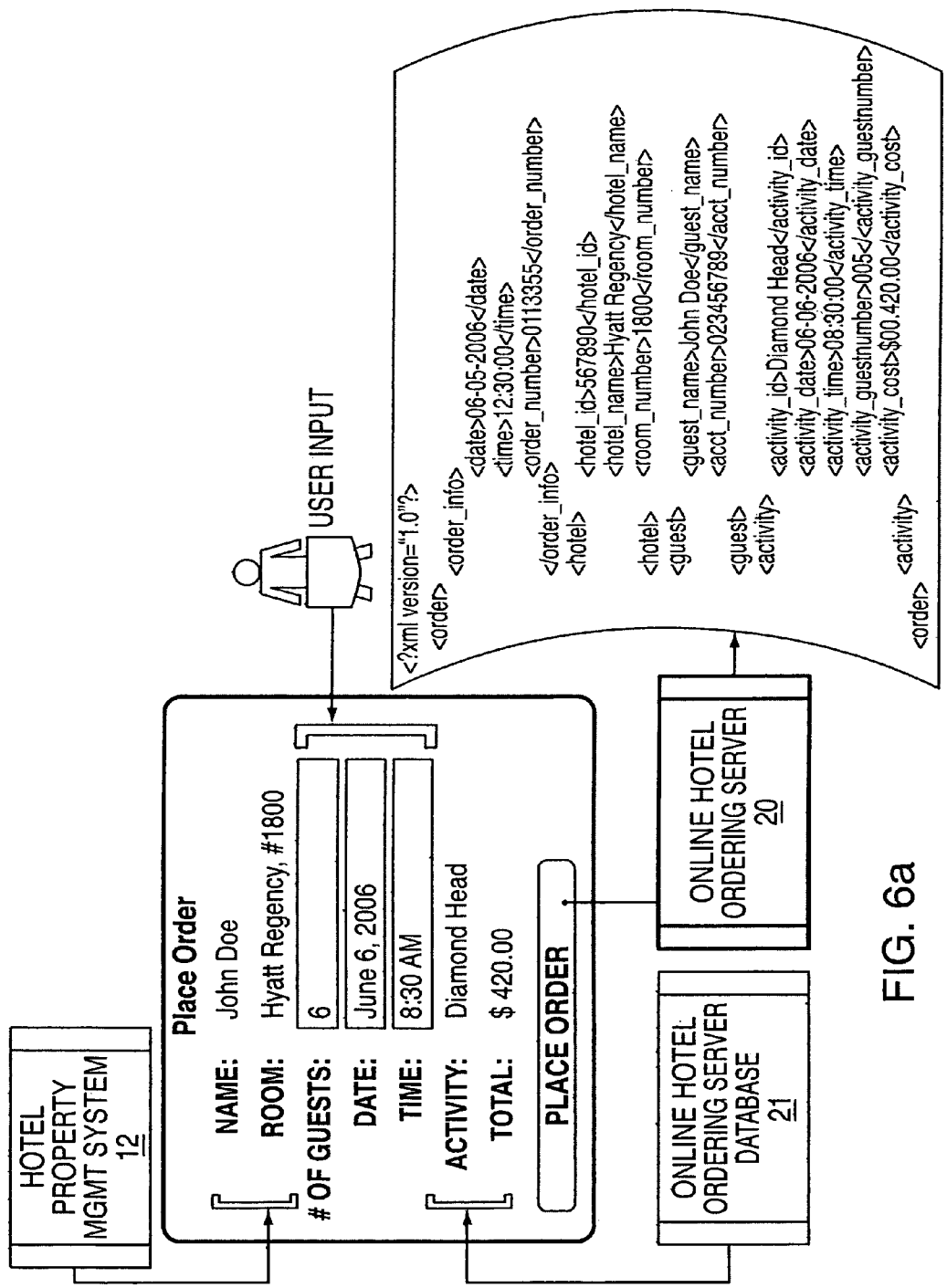
FIG. 6A illustrates an example of conversion of a forwarded order from a TV system platform into a formatted online order.

FIG. 6A illustrates an example of conversion of a forwarded order from a TV system platform into a formatted online order. The online agent ordering server stores a plurality of TV ordering display templates for TV ordering forms for respective transactable items, such as the one shown entitled "Place Order" for the Diamond Head activity. It also stores a plurality of online ordering formatted templates for presenting online orders in standard web-based format (HTML encoded) recognized by the online ordering website, such as the one shown entitled "?xml version+*1.0*?" for that Diamond Head activity.

In the hotel activity ordering example, when the viewer clicks on an activity on the guest advertising channel or from a menu of activities (see FIG. 3), a request for the activity is sent by the hotel TV system to the Online Hotel Ordering Server, which provides the corresponding template for the TV ordering form for the selected activity (along with any pre-established or updated activity data) to the TV system. For the guest's convenience, the TV ordering form is pre-populated with guest and room data from the HPMS. This may be done by appending the HPMS data to be sent with the initial activity request, or by filling in the TV ordering display template from the Online Hotel Ordering Server using an order-filling software engine co-located with the hotel TV system. The pre-filled TV ordering form is then displayed on the guest's TV for input of the guest's selections for the order. Upon the guest inputting the desired order selection data to the displayed TV ordering form, the TV systems sends the order request data to the Online Hotel Ordering Server, which automatically extracts the relevant data by name fields and enters the data into the formatted online order form for that item to be sent to the online activities booking website.

Figure 6B:
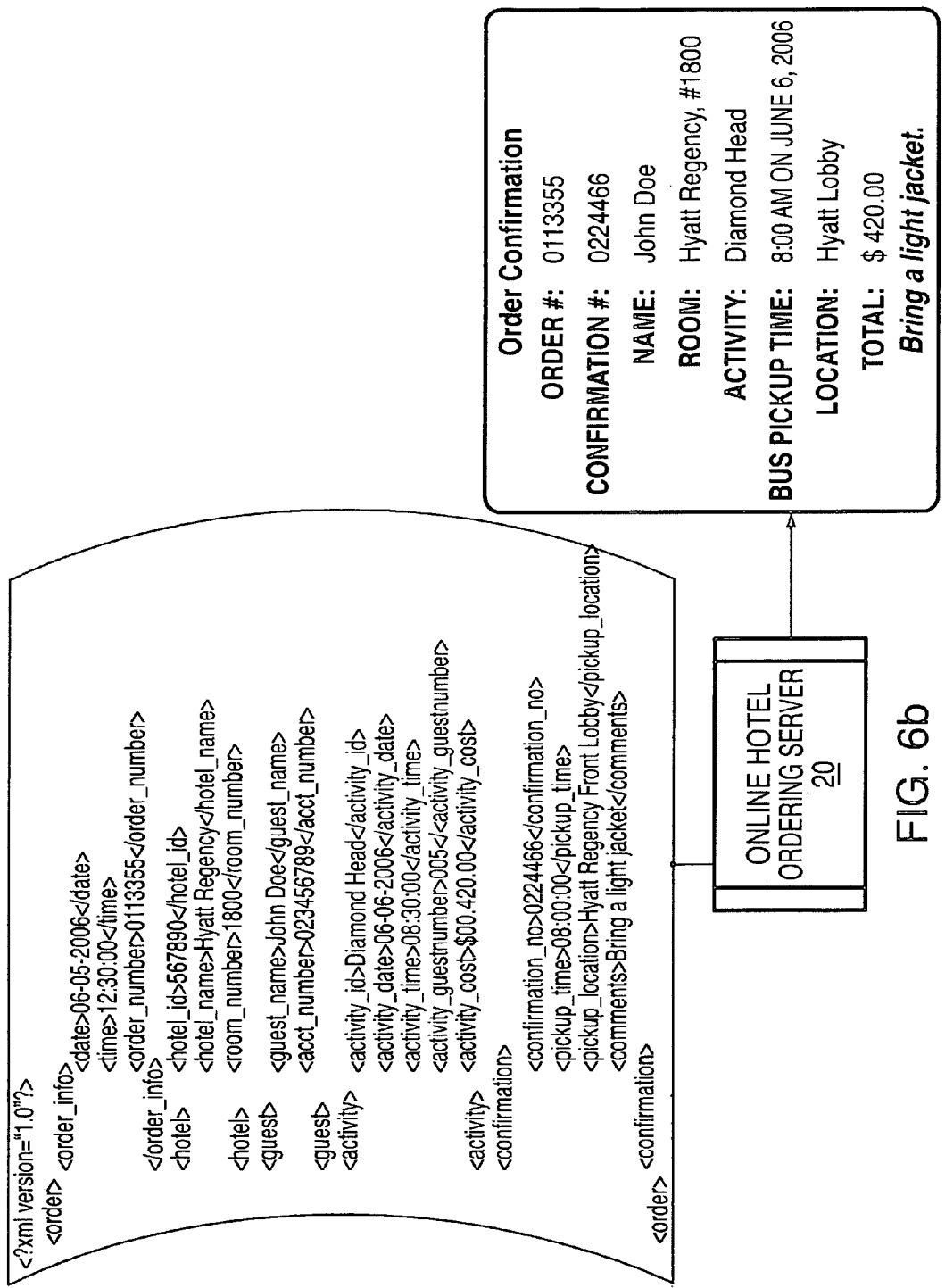
FIG. 6B shows an example of conversion of a web-based confirmation message into a return confirmation code to a TV system platform to generate a confirmation display on the TV.

FIG. 6B shows an example of conversion of a web-based confirmation message with a confirmation code from an online ordering server to a TV confirmation display message sent to the TV system for display on the viewer's TV. In the hotel activity ordering example, when the online activities booking website sends back the confirmation message for the Diamond Head activity, including "confirmation_no", "pickup_time", "pickup_location", and "comments: Bring a light jacket", the Online Hotel Ordering Server automatically converts it to a TV display confirmation message tagged with that guest's identity and hotel/room number. The TV display confirmation message is sent to the hotel TV system which sends a billing entry with the "confirmation_no" to the HPMS for that guest's billing, and sends also the TV display confirmation message to the guest's in-room TV. If the confirmed order Is not correct, the guest may correct it using the "Change" procedure described above (FIG. 4).

Display of Information Updates/Discounts

The Online Agent Ordering Server provides another useful function through its capability to upload updated information to the connected TV system platform(s). TV system platforms such as those offered by LodgeNet Entertainment (for hotels) allow an Internet connection to be opened and various website feeds to be grabbed and imported into video displays in the TV system, such as photos, news pages, weather maps, stock market charts, etc. This web access function of the TV system platforms provides the Online Agent Ordering Server with a backdoor to upload information that can be imported into video displays in the TV system. For example, if the Guest Advertising Channel is structured in menu format which can be updated with new linked files, then new activity titles, display pages, and videos can be uploaded to the Hotel TV System and added as new activity offerings on the Guest Advertising Channel. For different hotel subscribers to the online activities ordering service, the operator of the Online Hotel Ordering Server can upload different activities offerings for different hotel types. For example, a high-end hotel may be updated with new cruise offerings, whereas a mid-range hotel may be updated with new sightseeing excursions.

Figure 7:
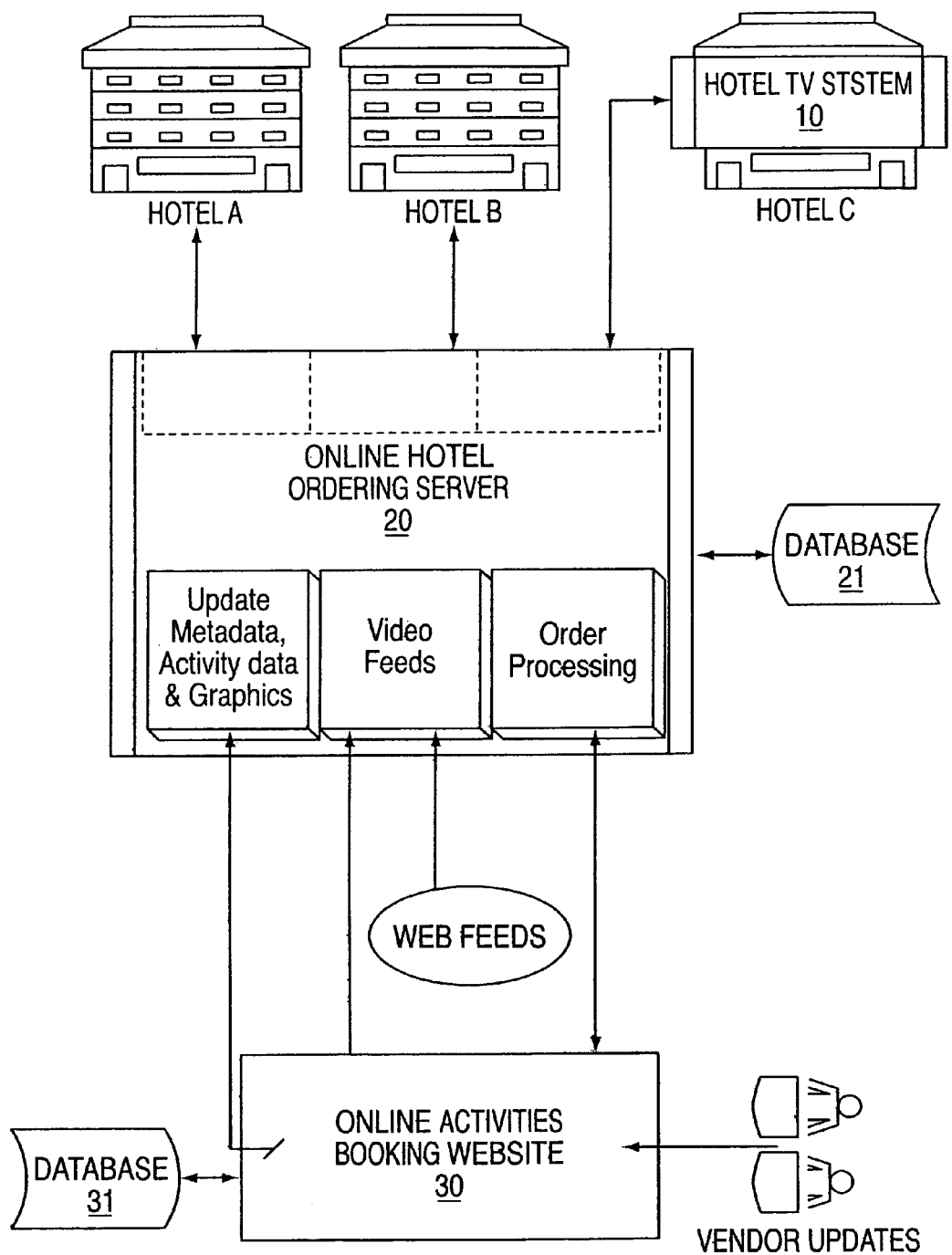
FIG. 7 illustrates an example of the updating/uploading of activity information for an online booking website and an online agent ordering server.

FIG. 7 illustrates an example of the updating/uploading of activity information for an online hotel ordering server. Vendors access the Online Activities Booking Website 30 to upload descriptive information, graphic images and videos regarding their activities. The Online Activities Booking Website 30 persistently stores this information in the Online Activities Booking Website Database 31 in order to provide updates to Online Hotel Ordering Server 20 when required. In addition to handling order processing with the Online Activities Booking Website 30, the Online Hotel Ordering Server 20 can obtain web feeds and convert them to new video feeds as well as take in vendor updated information, graphics and videos on activities from the Online Activities Booking Website 30 and convert them to new activities titles, display pages, and video ads to be added to the Guest Advertising Channel of Hotels A, B, C, etc. The video feeds, activities information, and graphics are persistently stored in the Online Hotel Ordering Server Database 21.

The updating/uploading of activity information from the online activity booking website to the online hotel ordering server and then subsequently to the TV system platforms enable a vendor to update information for an activity on a seasonal, daily or even hourly basis and have it immediately displayed to hotel guests. For example, a seasonal discount offer may be added as a seasonal update to the display page for a particular activity as listed on the menu on the Guest Advertising Channel. Thus, in off-season months, an activity can be offered at a discount to attract enough guests for the activity to remain profitable.

In other circumstances, the discount offer may be an urgent promotion for immediate notice on the Guest Advertising Channel, such as when a vendor has 50 unbooked seats on a cruise that departs in 2 hours and is willing to offer customers a 50% discount. In the latter case, the discount offer may appear as an overlay footnote on any content to be displayed on the Guest Advertising Channel, directing the guest to check out the urgent promotion for that particular activity, and the activity display page and TV system platform data are correspondingly updated with the updated information for the urgent discount offer. In this fashion, the urgent discount offer would be immediately displayed to all hotel guests watching the Guest Advertising Channel, and those that are attracted by the steep discount could promptly book an order for seats through the hotel TV system to the online activities ordering website.

This unique capability to send a "blast" of updated ordering information for immediate viewing and ordering by guests on their TVs would enable vendors to fill excess seats for their activities on a real-time basis thereby increasing their profitability.

Figure 8A:
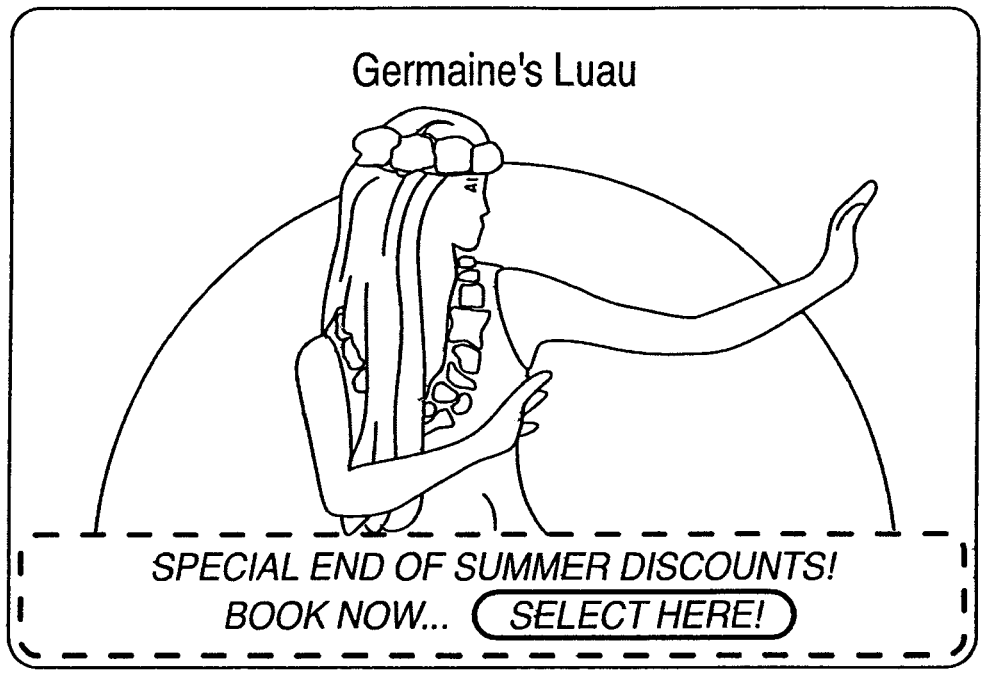
FIG. 8A illustrates an example of time-sensitive promotional message handling for specific activities.
Figure 8B:
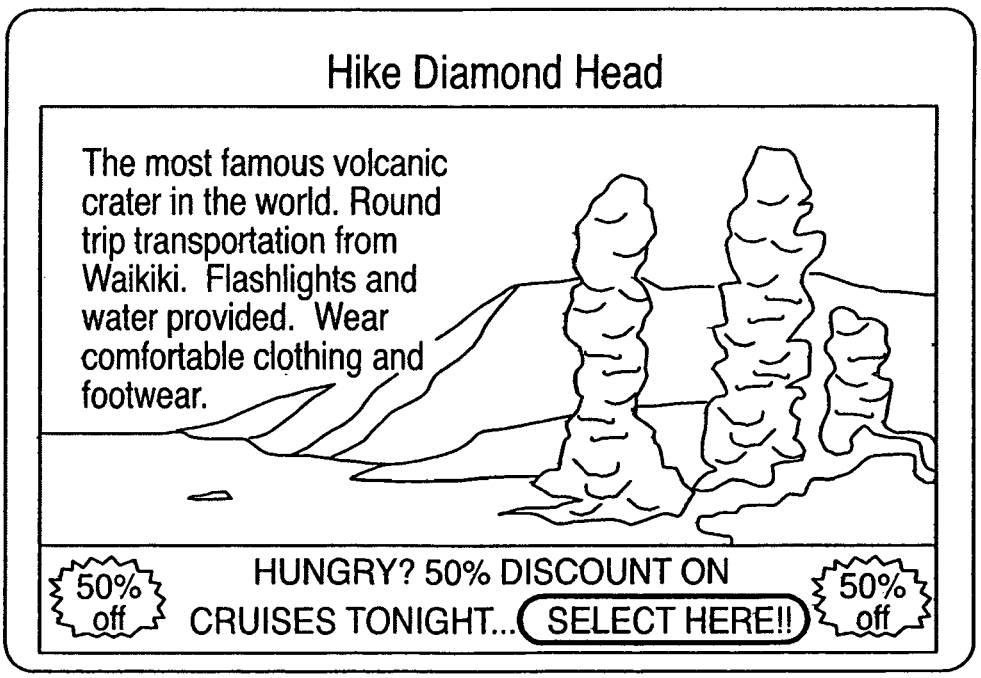
FIG. 8B illustrates an example of time-sensitive promotional message handling for the Guest Advertising Channel.

FIG. 8A illustrates an example of a seasonal discount offer used to update the display page for a particular activity on the Guest Advertising Channel, and FIG. 8B shows an example of an urgent discount offer for immediate notice to all viewers on the Guest Advertising Channel.

In other configurations or variations, the Online Activities Booking Website can also be used by other Wholesale Distribution Channels (such as global distribution systems, consolidators, etc.) for online inventory management for subscribing vendors and/or as sources of other activities inventories. The Online Hotel Ordering Server may also serve as an intermediary Agent for other universes of self-contained TV ordering systems, such as military base TV systems, school TV systems, or even cable TV systems for the surrounding service areas that offer "shopping mall" channels.

The Online Agent Ordering Server plays an important role as an intermediary between the TV systems and the online ordering systems. The online ordering systems provide the advantages of online confirmation through real-time inventory management for orders from any web-based source, for automatic processing of online orders in standard web-based format, and for combining access to multiple vendor inventories on the website. On the other hand, service area TV system platforms can reach wide audiences of viewers while they are relaxing or seeking entertainment. The Online Agent Ordering Server acts as the intermediary that converts orders from TV system platforms into properly formatted online orders and, conversely, to convert web-based confirmation messages into the confirmation displays on the TV. Additionally, the Online Agent Ordering Server must be capable of integrating the viewer input selections and signals with metadata and item-specific data maintained in the Online Agent Ordering Server database and with viewer-specific data provided by the TV system platform in order to create a complete order for forwarding to the Online Activities Booking System.

The Online Agent Ordering Server may be co-located or incorporated with the TV system platform in situations where it is used exclusively by the operator of the TV system platform, such as a hotel that wants exclusive activity ordering capability not shared with any other hotels. However, it is most likely to be set up as a web server addressable at a separate Internet address for use by other TV system platforms, such as when an online activities ordering service provider provisions connectivity for a number of hotels to an online booking system in a service area.

Figures 9, 9A:
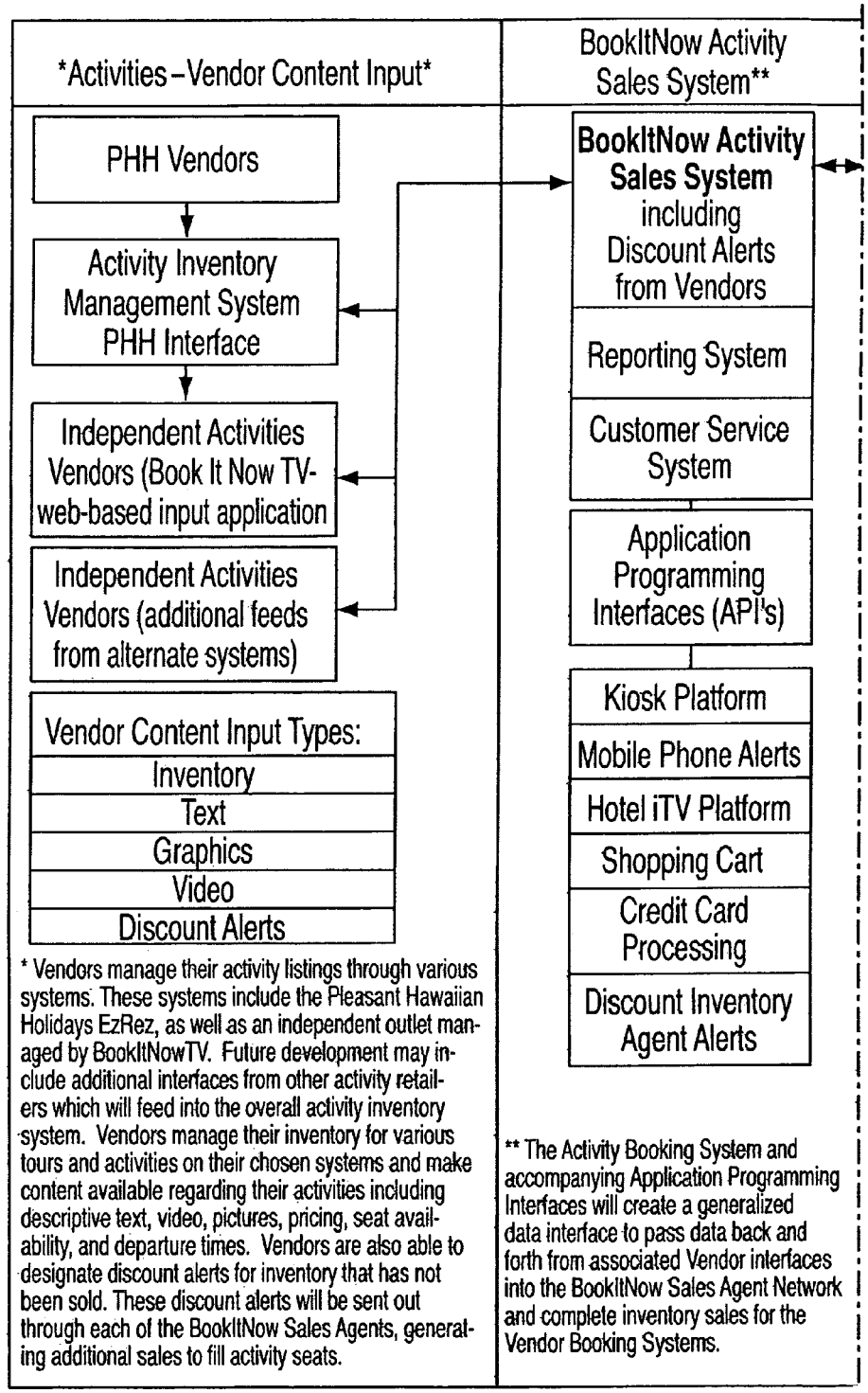
FIG. 9 illustrates the use of the online agent ordering server to handle TV-based orders from a wide range of other TV system platforms.
Figure 9B:
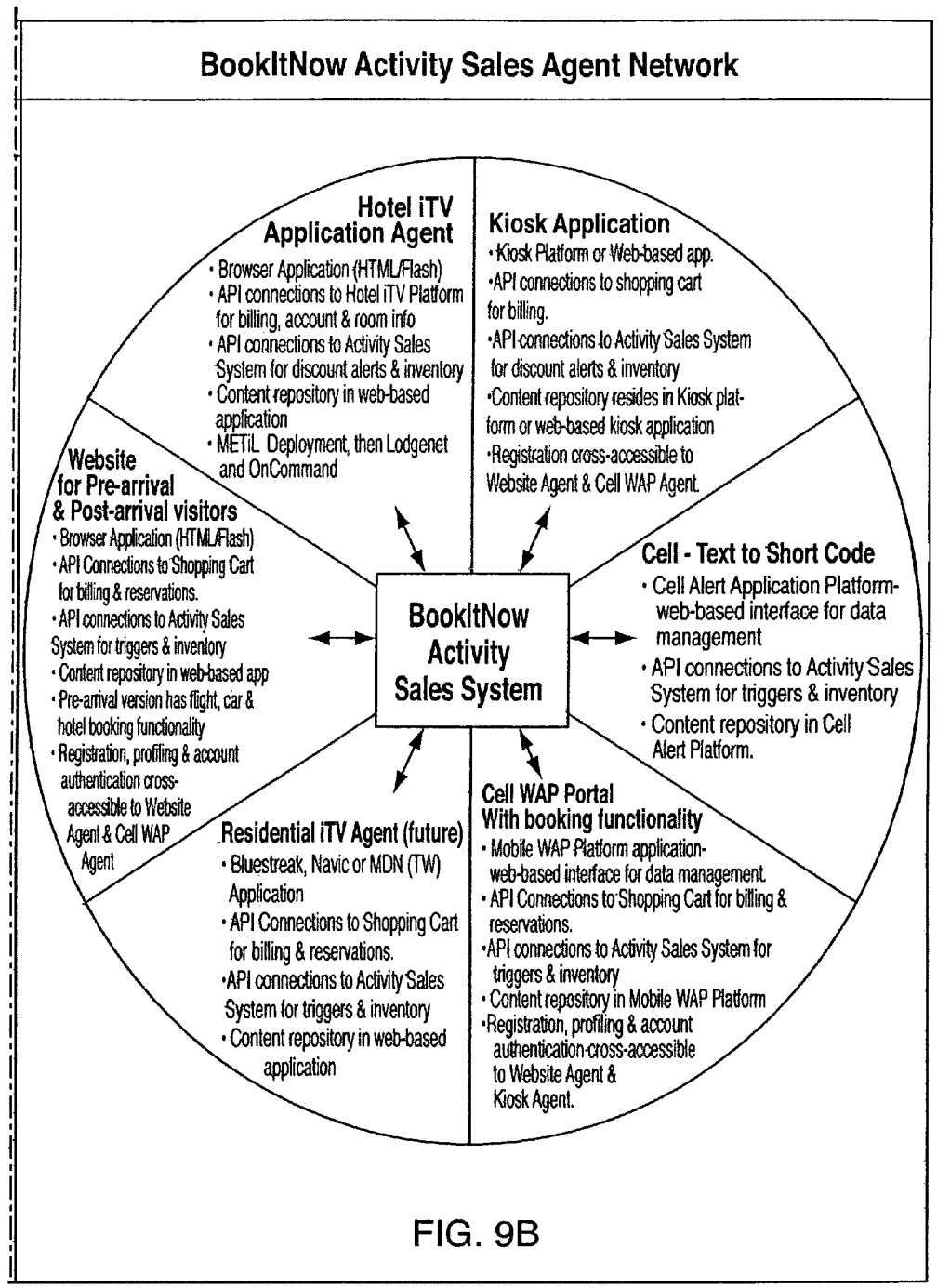

FIG. 9 illustrates the use of the online agent ordering server to handle TV-based orders from a wide range of other TV system platforms, including video kiosk applications, cellphone text ad displays, cellphone browser ad displays, cable or broadband TV applications, and online browser applications. The different video input systems can be handled by a single integrated online agent ordering system ("BookItNow Activity Sales System") through common interfaces for web-based connectivity, or by separate systems for each type of platform. The BookItNow Activity Sales System can also offer a wide range of sales support services, such as discount alerts, reporting, and customer service through APIs with functions for the kiosk platform, mobile phone alerts, hotel iTV platform, user shopping cart, credit card processing, and discount inventory alerts. The BookItNow Activity Sales System can include a wide range of vendor services, such as vendor inventory management and interfaces to independent vendor websites. The offering of integrated and multi-platform services has the potential to greatly increase the value of TV advertising and the volume of sales or bookings made while watching TV ads.

It is understood that many modifications and variations may be devised given the above description of the principles of the invention. It is intended that all such modifications and variations be considered as within the spirit and scope of this invention, as defined in the following claims.

The invention claimed is:

1. An online ordering system for ordering of items of real-time availability in inventory online through a networked TV system comprising:

(a) an interactive TV system having a plurality of TV equipment units connected on a network to a TV services platform, wherein each TV equipment unit comprises of TV display and a TV remote control unit for sending signals to a set-top box through which the TV equipment unit is connected to the TV services platform, whereby a TV viewer can view an advertisement for a transactable item displayed on the TV display and send a request for ordering the item by request signals entered by keypresses on the TV remote control unit and sent to the TV services platform; and (b) a transaction-ordering web server co-located with and operatively connected to the TV services platform for receiving requests sent from TV viewers for transactable items of real-time availability and processing said requests into web orders sent online via Internet connection to online ordering websites for processing the web orders against real-time vendor inventories of transactable items and confirming transactions of ordered items, wherein, upon a TV viewer inputting a request for a selected transactable item displayed on the TV display using the TV remote control unit to send request signals via the set-top box to the TV services platform, said TV services platform is configured to send the request signals to the co-located transaction-ordering web server, the co-located transaction-ordering web server further being configured to process the request signals into a web order to be sent to an online ordering website for the transactable item and processed against a corresponding real-time vendor inventory for the transactable items and confirmed as a fulfilled transaction of the ordered item, wherein said TV system is a hotel in-room TV system which is coupled to a hotel purchase management system (PMS) used by the hotel to manage guest billings for purchases, and said hotel in-room TV system is operable with said hotel purchase management system to process billings of guest requests for transactable items via the hotel in-room TV units for hotel guests, wherein said hotel in-room TV system is configured to a guest advertising channel on guest in-room TV units programmed with advertising for guest activities of interest, so that a guest can send a request for ordering a selected activity item using the TV remote control unit while viewing a corresponding advertisement on the guest advertising channel, and wherein said transaction-ordering web server is operable to provide updates of activities information to said hotel in-room TV system and updates of advertisements for guest activities on the guest advertising channel of the hotel in-room TV system.

2. An online ordering system according to claim 1, wherein said transaction-ordering web server is addressable by the TV services platform at an Internet address.

3. An online ordering system according to claim 1, wherein upon receiving a transaction confirmation message from an online ordering website, said transaction-ordering web server converts it into a TV display confirmation message that is sent via the TV services platform to the TV equipment unit of the TV viewer sending the request for display to the TV viewer.

4. An online ordering system according to claim 1, wherein transaction-ordering web server is connected to a plurality of online ordering websites maintaining respective real-time vendor inventories of transactable items.

5. An online ordering system according to claim 1, wherein said transaction-ordering web server is operable to provide updates of activities information and advertisements for guest activities available on a same-day basis at a discount.

6. An online ordering system for ordering of items of real-time availability in inventory online through a networked TV system comprising:
(a) an interactive TV system having a plurality of TV equipment units connected on a network to a TV services platform, wherein each TV equipment unit comprises of TV display and a TV remote control unit for sending signals to a set-top box through which the TV equipment unit is connected to the TV services platform, whereby a TV viewer can view an advertisement for a transactable item displayed on the TV display and send a request for ordering the item by request signals entered by keypresses on the TV remote control unit and sent to the TV services platform; and
(b) a transaction-ordering web server co-located with and operatively connected to the TV services platform for receiving requests sent from TV viewers for transactable items of real-time availability and processing said requests into web orders sent online via Internet connection to online ordering websites for processing the web orders against real-time vendor inventories of transactable items and confirming transactions of ordered items,
wherein, upon a TV viewer inputting a request for a selected transactable item displayed on the TV display using the TV remote control unit to send request signals via the set-top box to the TV services platform, said TV services platform is configured to send the request signals to the co-located transaction-ordering web server, the co-located transaction-ordering web server further being configured to process the request signals into a web order to be sent to an online ordering website for the transactable item and processed against a corresponding real-time vendor inventory for the transactable items and confirmed as a fulfilled transaction of the ordered item,
wherein said TV system is a hotel in-room TV system which is coupled to a hotel purchase management system (PMS) used by the hotel to manage guest billings for purchases, and said hotel in-room TV system is operable with said hotel purchase management system to process billings of guest requests for transactable items via the hotel in-room TV units for hotel guests, and
wherein said transaction-ordering web server is operable with said hotel purchase management system (PMS) to obtain guest cellphone numbers or mobile device addresses and send messages to guest cellphones or mobile devices to provide updates of activities information and advertisements for guest activities.

7. An online ordering system according to claim 6, wherein said transaction-ordering web server is operable with said hotel purchase management system (PMS) to process billings of guest requests for transactable items sent via guest cellphones or mobile devices.

* * * * *